United States Patent Office 2,981,743
Patented Apr. 25, 1961

2,981,743
PROCESS FOR PRODUCTION OF 4-ALKYL AND 4-BENZYL DERIVATIVES OF Δ4 PREGNENES

Howard J. Ringold and George Rosenkranz, Mexico City, Mexico, assignors to Syntex S.A., Mexico City, Mexico, a corporation of Mexico No Drawing. Filed Jan. 23, 1957, Ser. No. 635,606
Claims priority, application Mexico Jan. 26, 1956
11 Claims. (Cl. 260—397.45)

The present invention relates to cyclopentanophenanthrene compounds and to the process for the production thereof.

More particularly the present invention relates to novel 4-alkyl and 4-aralkyl derivatives of Δ4-pregnene-17α,21-diol-3,11,20-trione and of Δ4-pregnene-11β,17α,21-triol-3,20-dione as well as the novel 21-esters of these compounds and to a process for their production.

The novel compounds of the present invention are hormones of the cortical type having desirable anti-arthritic action.

In accordance with the present invention it has been discovered that compounds of the type referred to may be prepared by treating the known 3,20-diethylene ketal of pregnane-17α,21-diol-3,11,20-trione or the 3,20-diethylene ketal of pregnane-11β,17α,21-triol-3,20-dione with acetic acid to form the corresponding 20-ethylene ketal thereof. The 20-ethylene ketal is then treated with ethyl formate in the presence of sodium hydride to obtain the corresponding 4-hydroxymethylene derivative. This hydroxymethylene derivative is then treated with an alkyl or aralkyl iodide to prepare the corresponding 4-alkyl or aralkyl-4′-formyl derivatives which are then subjected to the action of a mild basic medium such as an alkaline activated alumina to remove carbon monoxide. The resultant product is the 20-ethylene ketal of respectively 4-alkyl or aralkyl-pregnane-17α,21-diol-3,11,20-trione or the 4-alkyl or aralkyl-pregnane-11β,17α,21-triol-3,20-dione. These compounds may then be hydrolized to give the corresponding pregnane derivatives. In the alternative the pregnane derivatives may also be prepared by treating the 20-ethylene ketals of the 4-alkyl or aralkyl-4′-formyl compounds with strong acid in methanol. The free compounds are then subjected to conventional esterification to give the corresponding 21-esters. The 21-esters of the 4-alkyl or aralkyl pregnane compounds are then treated with approximately 1 molar equivalent of bromine in acetic acid to give the corresponding 21-esters of 4-alkyl or aralkyl-4′-bromo-pregnane-17α,21-diol-11,20-trione or the 4-alkyl or aralkyl-4′-bromo-pregnane-11β,17α,21-triol-3,20-dione. These compounds are then dehydrobrominated with a tertiary base such as collidine to give the corresponding Δ4-derivatives. The esters thus produced may then be conventionally saponified under mild conditions to give the corresponding 21-hydroxy compounds.

The novel compounds of the present invention may therefore be exemplified by the following formula:

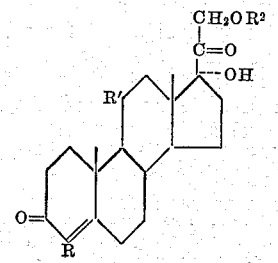

In the above formula R represents an alkyl group preferably a lower alkyl group such as methyl, ethyl or propyl or R may represent an aralkyl group such as benzyl. R′ represents

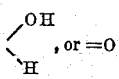

$R^2$ represents hydrogen or an acyl group of the type conventionally found in esterified steroid alcohols. These are generally those derived from hydrocarbon carboxylic acids of less than 12 carbon atoms such as acetic, propionic, cyclopentylpropionic, benzoic, etc.

The novel compounds of the present invention may be prepared by process exemplified by the following equation:

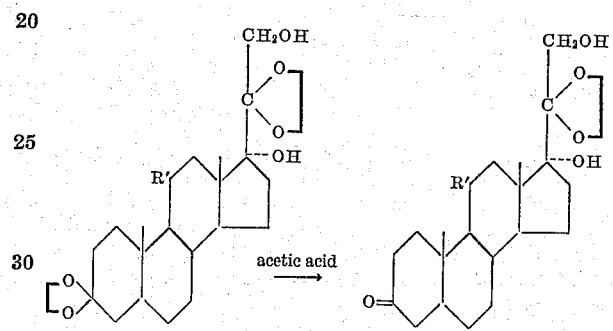

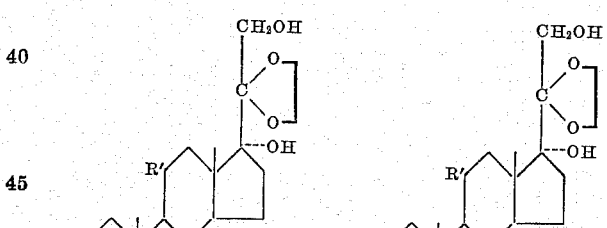

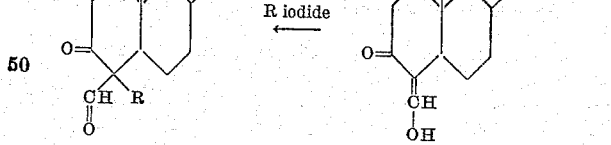

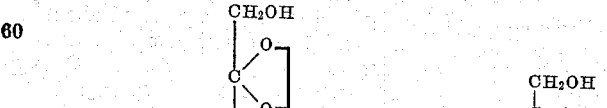

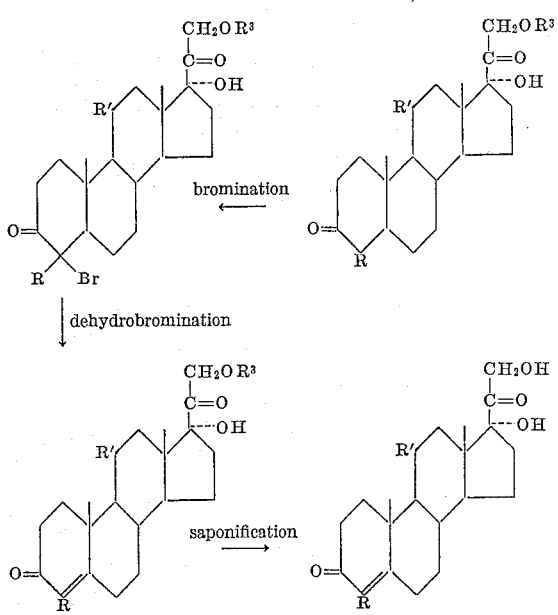

In the above equation R and R′ represent the same groups as heretofore set forth. R³ represents an acyl group of the type conventionally found in esterified steroid alcohols. These are generally those derived from hydrocarbon carboxylic acids of less than 12 carbon atoms such as acetic, propionic, cyclopentylpropionic, benzoic etc.

In practicing the invention as outlined above, the 3,20-diethylene ketal of pregnane-17α,21-diol-3,11,20-trione or pregnane-11β,17α,21-triol-3,20-dione is treated with acetic acid in order to produce the corresponding 20-monoethylene ketal. The 20-ethylene ketal thus produced is suspended in an inorganic solvent such as anhydrous benzene and is then mixed with ethyl formate and sodium hydride. The reaction mixture is then stirred for a relatively long period of time (of the order of 3 days) under a nitrogen atmosphere. Upon decomposition of the excess hydride and addition of ice water, two layers were formed with the desired hydroxymethylene derivatives in the aqueous layer in the form of their sodium salts. After separation of the aqueous layer, acidification and purification the desired corresponding 20-ethylene ketal of the 2-hydroxymethylene derivative was obtained.

The product of the step just described together with sodium hydride was suspended in an inorganic solvent such as benzene and treated with an organic iodide, preferably a lower alkyl or aralkyl iodide such as methyl, ethyl, propyl or benzyl iodide, by heating or refluxing for a prolonged period of time (of the order of 24 hours). Preferably the treatment was carried out under an atmosphere of nitrogen and after about 24 hours, additional iodide was added and refluxing continued for about 48 hours additional. Then an additional quantity of iodide was added and refluxing continued for a total of about 72 hours. The reaction mixture was then cooled and washed with dilute base to remove unreacted starting material. After separation, evaporation of the organic layer and crystallization of the organic layer residue, the product was the 20-ethylene ketal of the 4-lower alkyl or benzyl-4′-formyl derivative of pregnane-17α,21-diol-3,11,20-trione or pregnane-11β,17α,21-triol-3,20-dione.

The 4-lower alkyl or benzyl-4′-formyl derivatives thus prepared were then treated with a mild base, preferably activated alumina (chromatographic type) of alkaline reaction. This treatment preferably involved passing a benzene solution of the compound through a column of the alumina and after about a day's time eluting the product from the column with an organic solvent such as ethyl acetate. The products after crystallization were the 20-ethylene ketals of the 4-lower alkyl or benzyl derivatives of the starting compound i.e. dihydrocortisone or dihydrohydrocortisone. The corresponding 20-ketone compounds were then prepared by hydrolyzing the 20-ethylene ketal group with a mineral acid in methanol.

The 20-ketones could also be prepared in one step in lesser yield by treating the formyl-derivatives with a mineral acid. In order to form the corresponding Δ⁴-compounds the compounds just described were treated with slightly over 1 molar equivalent bromine in acetic acid in the presence of a small amount of hydrogen bromide. The 4-bromo derivatives obtained are then dehydrohalogenated with a tertiary amine such as collidine. Prior to the bromination, it is desirable that the saturated 4-alkyl or aralkyl derivatives be esterified in the 21 position. This was done by conventional esterification, as is well known in the steroid art, as by treating the 21-hydroxy derivatives with acid anhydrides in pyridine or with acyl halides. The esters which are produced are generally characterized as hydrocarbon carboxylic acid esters of less than about 12 carbon atoms as heretofore set forth. After bromination and dehydrobromination therefore there is prepared the corresponding 21-hydrocarbon carboxylic acid esters of less than about 12 carbon atoms of 4-alkyl or aralkyl-Δ⁴-pregnene-17α,21-diol-3,11,20-trione and the corresponding 4-alkyl or aralkyl-Δ⁴-pregnene-11β,17α,21-triol-3,20-dione compound. By conventional saponification as with potassium hydroxide and methanol below room temperature there was prepared the corresponding free 21-alcohol.

The following specific examples serve to illustrate but are not intended to limit the present invention.

Example I

A solution of 2 g. of the 3,20-diethyleneketal of pregnane-17α,21-diol-3,11,20-trione in 40 cc. of 90% acetic acid was heated on the steam bath for 20 minutes, poured into water and extracted with chloroform. The chloroform solution was washed to neutral, dried over sodium sulfate and evaporated to dryness. Crystallization of the residue from acetone afforded the 20-monoethyleneketal of pregnane-17α,21-diol-3,11,20-trione (20-monoethyleneketal of dihydrocortisone).

10 g. of the 20-monoethyleneketal of dihydrocortisone suspended in 500 cc. of anhydrous benzene free of thiophene was mixed with 10 g. of ethyl formate and 3 g. of sodium hydride and the mixture was stirred for 3 days under an atmosphere of nitrogen. The excess of hydride was decomposed by the cautious addition of 15 cc. of methanol, followed by the addition of 30 cc. of ice water. Two layers formed, of which the aqueous layer contained the 4-hydroxymethylene derivative in the form of its sodium salt. The layers were separated and the aqueous layer was washed with ether and benzene, cooled to a temperature of 5° C. and acidified with an aqueous solution of ammonium chloride. It was extracted with methylene dichloride and the solution was evaporated to dryness under vacuum. Crystallization of the residue from acetone-hexane produced the 20-ethyleneketal of 4-hydroxymethylene-dihydrocortisone.

3 g. of the above compound and 170 mg. of sodium hydride were suspended in 50 cc. of benzene, mixed with 10 cc. of methyl iodide and the mixture was refluxed under an atmosphere of nitrogen. After 24 hours an additional 10 cc. of methyl iodide was added, followed by 10 cc. more after 48 hours, and the refluxing was continued to a total of 72 hours. The cooled mixture was washed with 1% sodium hydroxide solution to remove traces of unreacted starting material and the organic layer was evaporated to dryness under reduced pressure. The residue crystallized from acetone-hexane to give the 20-ethyleneketal of 4-methyl-4′-formyl-pregnane-17α,21-diol-3,11,20-trione. This compound showed no color reaction with ethanolic ferric chloride even after standing for 24 hours.

1 g. of the above compound was dissolved in benzene and this solution was used to impregnate a column with 100 g. of alkaline activated alumina. After 24 hours the column was eluted with ethyl acetate and the combined eluate was crystallized from acetone-hexane, thus yielding the 20-ethyleneketal of 4-methyl-dihydrocortisone.

1 g. of such 20-ethyleneketal was dissolved in 50 cc. of methanol containing 5 cc. of 8% sulfuric acid and the mixture was refluxed for 50 minutes. Water was added to the cooled mixture, the methanol was removed by distillation under reduced pressure and the residue was neutralized with sodium bicarbonate and extracted with chloroform. Crystallization afforded 4α - methyl - dihydrocortisone.

Acetylation by routine methods with acetic anhydride in pyridine solution at room temperature gave the 21-acetate of 4α-methyl-dihydrocortisone. There was also prepared by conventional reaction with acid anhydrides and acid halides the propionate, cyclopentylpropionate and benzoate.

Example II 1 g. of the 20-ethyleneketal of 4-methyl-4'-formyl-pregnane-17α,21-diol-3,11,20-trione was dissolved in 50 cc. of methanol and mixed with an 8% aqueous solution of sulfuric acid and the solution was refluxed for 50 minutes. The cooled mixture was diluted with water, the methanol was removed by distillation under reduced pressure and the residue was neutralized with sodium bicarbonate and extracted with chloroform. Crystallization yielded 4α-methyl-dihydrocortisone, identical to the one obtained in accordance with Example I.

Example III 1 g. of the 20-ethyleneketal of 4-hydroxymethylene-dihydrocortisone was treated in accordance with the method described in Example I, using ethyl iodide instead of methyl iodide, thus producing 4-ethyl-dihydrocortisone as well as its 21-acetate and other esters there mentioned.

Example IV 1 g. of the 20-ethyleneketal of 4-hydroxymethylene-dihydrocortisone was treated in accordance with the method described in Example I, using propyl iodide instead of methyl iodide, thus giving 4-propyl-dihydrocortisone as well as its 21-acetate and other esters there mentioned.

Example V

A mixture of 2.2 g. of the 20-ethyleneketal of 4-hydroxymethylene-dihydrocortisone, 170 mg. of sodium hydride, 50 cc. of benzene and 10 cc. of benzyl iodide was refluxed for 72 hours under an atmosphere of nitrogen. The cooled mixture was washed with previously cooled 1% sodium hydroxide solution and then evaporated to dryness. Crystallization from acetone-hexane gave the 20-ethyleneketal of 4-benzyl-4'-aldehydo-pregnane-17α,21-diol-3,11,20-trione.

The treatment of this compound with alkaline activated alumina followed by or combined with a hydrolysis such as has been described in Examples I and II, yielded 4α-benzyl-dihydrocortisone and its esters.

Example VI

A solution of 20 g. of the 3,20-diethyleneketal of pregnane-17α,21-diol-3,11,20-trione in 400 cc. of anhydrous tetrahydrofurane was treated with 4 g. of lithium aluminum hydride and the mixture was refluxed for 4 hours and cooled. Water was cautiously added to decompose the excess of hydride, the mixture was poured into water and then Rochelle salt was added, and the product was extracted with ethyl acetate. The extract was evaporated to dryness and the residue was purified by chromatography thus giving the diketal of pregnane-11β,17α,21-triol-3,20-dione.

This diketal was partially hydrolyzed at C-3 using the method described in the first paragraph of Example I to give the 20-monoethyleneketal of pregnane-11β,17α,21-triol-3,20-dione.

1 g. of such 20-monoethyleneketal was treated in accordance with the method described in Example I, thus giving 8 g. of the 20-ethylene-ketal of 4-hydroxymethylene-pregnane-11β,17α,21-triol-3,20-dione.

The treatment of 3 g. of the 20-ethyleneketal of 4-hydroxymethylene-pregnane - 11β,17α,21-triol-3,20-dione in accordance with the method described in Examples I and/or II afforded 4-methyl-pregnane-11β,17α,21-triol-3,20-dione, from which the 21-acetate and other ester were also prepared in accordance with the method of Example I. By the same method but using the corresponding iodides there were also prepared the propyl, ethyl and benzyl derivatives.

Example VII

A solution of 1 g. of the 21-acetate or other esters previously set forth of 4-methyl-pregnane-17α,21-diol-3,11,20-trione in 50 cc. of acetic acid containing a few drops of a solution of hydrogen bromide in acetic acid was treated dropwise under stirring at room temperature with a solution of 0.42 g. (1.1 molar equivalents) of bromine in 10 cc. of acetic acid. After standing for 20 minutes, the mixture was poured into water and the precipitate was collected, washed with water and air dried.

1 g. of this 4-methyl-4'-bromo compound was refluxed for 1 hour with 3 cc. of collidine and diluted with ethyl acetate. The collidine hydrobromide was filtered and the filtrate was washed with dilute sulfuric acid and water and evaporated to dryness. Chromatographic purification on activated alumina afforded the 21-acetate or other corresponding esters of 4-methyl-$\Delta^4$-pregnene-17α,21-diol-3,11,20-trione.

1 g. of this acetate or other ester was dissolved in 50 cc. of methanol and the solution was cooled to 0° C. while a stream of nitrogen was being passed through the solution. Still under nitrogen, a solution was added of 100 mg. of potassium hydroxide in 1 cc. of water. After 1 hour, it was slightly acidified with acetic acid, the solvent was evaporated under reduced pressure, sodium chloride solution was added to the residue and the precipitate was filtered, washed and dried. Crystallization from acetone-hexane yielded 4-methyl-$\Delta^4$-pregnene-17α,21-diol-3,11,20-trione.

Example VIII

Starting from the 21-acetate or other ester of 4-ethyl-pregnane-17α,21-diol-3,11,20-trione and following the method described in Example VII, there was obtained the corresponding esters of and 4-ethyl-$\Delta^4$-pregnene-17α,21-diol-3,11,20-trione.

Example IX

Starting from the 21-acetate or other ester of 4-propyl-pregnane-17α,21-diol-3,11,20-trione and following the method described in Example VII, there was obtained the corresponding esters of and 4-propyl-$\Delta^4$-pregnene-17α,21-diol-3,11,20-trione.

Example X

Starting from the 21-acetate or other ester of 4-benzyl-pregnane-17α,21-diol-3,11,20-trione and following the method described in Example VII, there was obtained the corresponding esters of and 4-benzyl-$\Delta^4$-pregnene-17α,21-diol-3,11,20-trione.

Example XI

Starting from the 21-acetate or other ester of 4-methyl-pregnane-11β,17α,21-triol-3,20-dione and following the method described in Example VII, there was obtained the corresponding esters of and 4-methyl-Δ⁴-pregnene-11β,17α,21-triol-3,20-dione.

Example XII

Starting from the 21-acetate or other ester of 4-ethyl-pregnane-11β,17α,21-triol-3,20-dione and following the method described in Example VII, there was obtained the corresponding esters of and 4-ethyl-Δ⁴-pregnene-11β,17α,21-triol-3,20-dione.

Example XIII

Starting from the 21-acetate or other ester of 4-propyl-pregnane-11β,17α,21-triol-3,20-dione and following the method described in Example VII, there was obtained the corresponding esters of and 4-propyl-Δ⁴-pregnene-11β,17α,21-triol-3,20-dione.

Example XIV

Starting from the 21-acetate of 4-benzyl-pregnane-11β,17α,21-triol-3,20-dione and following the method described in Example VII, there was obtained the corresponding esters of and 4-benzyl-Δ⁴-pregnene-11β,17α,21-triol-3,20-dione.

We claim:

1. A process for the production of compounds selected from the group consisting of 4-lower alkyl and 4-benzyl derivatives of Δ⁴-pregnene-11β,17α,21-triol-3,20-dione and Δ⁴-pregnene-17α,21-diol-3,11,20-trione comprising treating respectively a compound selected from the group consisting of 20-ethyleneketals of pregnane-11β,17α,21-triol-3,20-dione and pregnane-17α,21-diol-3,11,20-trione with ethyl formate to form the corresponding 4-hydroxymethylene derivatives, treating the last mentioned derivatives with an iodide selected from the group consisting of lower alkyl iodides and benzyl iodides to form the corresponding compounds selected from the group consisting of 4-lower alkyl-4'-formyl derivatives and 4-benzyl-4'-formyl derivatives, eliminating carbon monoxide and hydrolysing the 20-ketal group of the formyl derivatives to form a compound selected from the group consisting of 4-lower alkyl-pregnane-11β,17α,21-triol-3,20-dione, 4-benzyl-pregnane-17α,21-diol-3,11,20-trione, 4-lower alkyl-pregnane-11β,17α,21-triol-3,20-dione and 4-benzyl-pregnane-17α,21-diol-3,11,20-trione, esterifying the last mentioned compound to form a hydrocarbon carboxylic acid ester thereof, monobrominating the last mentioned compound to form the corresponding 4-bromo derivatives, dehydrobrominating the 4-bromo derivatives and saponifying the ester group.

2. The process of claim 1 wherein the elimination of carbon monoxide and hydrolysis of the 20-ketal group was carried out in a single step with sulfuric acid in methanol.

3. The process of claim 1 wherein the elimination of carbon monoxide is carried out by reaction with activated alumina, the hydrolysis of the ketal group is subsequently carried out with sulfuric acid in methanol, the bromination is performed with approximately one molar equivalent of bromine in acetic acid and the dehydrobromination is with collidine.

4. The process of claim 1 wherein the starting material is the 20-ethyleneketal of pregnane-17α,21-diol-3,11,20-trione, the iodide is methyl iodide and the product is 4-methyl-Δ⁴-pregnene-17α,21-diol-3,11,20-trione.

5. The process of claim 1 wherein the starting material is the 20-ethyleneketal of pregnane-17α,21-diol-3,11,20-trione, the iodide is ethyl iodide and the product is 4-ethyl-Δ⁴-pregnene-17α,21-diol-3,11,20-trione.

6. The process of claim 1 wherein the starting material is the 20-ethyleneketal of pregnane-17α,21-diol-3,11,20-trione, the iodide is propyl iodide and the product is 4-propyl-Δ⁴-pregnene-17α,21-diol-3,11,20-trione.

7. The process of claim 1 wherein the starting material is the 20-ethyleneketal of pregnane-17α,21-diol-3,11,20-trione, the iodide is benzyl iodide and the product is 4-benzyl-Δ⁴-pregnene-17α,21-diol-3,11,20-trione.

8. The process of claim 1 wherein the starting material is the 20-ethyleneketal of pregnane-11β,17α,21-triol-3,20-dione, the iodide is methyl iodide and the product is 4-methyl-Δ⁴-pregnene-11β,17α,21-triol-3,20-dione.

9. The process of claim 1 wherein the starting material is the 20-ethyleneketal of pregnane-11β,17α,21-triol-3,20-dione, the iodide is ethyl iodide and the product is 4-ethyl-Δ⁴-pregnene-11β,17α,21-triol-3,20-dione.

10. The process of claim 1 wherein the starting material is the 20-ethyleneketal of pregnane-11β,17α,21-triol-3,20-dione, the iodide is propyl iodide and the product is 4-propyl-Δ⁴-pregnene-11β,17α,21-triol-3,20-dione.

11. The process of claim 1 wherein the starting material is the 20-ethyleneketal of pregnane-11β,17α,21-triol-3,20-dione, the iodide is benzyl iodide and the product is 4-benzyl-Δ⁴-pregnene-11β,17α,21-triol-3,20-dione.

References Cited in the file of this patent

UNITED STATES PATENTS

| | | |
|---|---|---|
| 2,744,122 | Djerassi et al. | May 1, 1956 |
| 2,782,212 | Heusser et al. | Feb. 19, 1957 |
| 2,793,208 | Korman et al. | May 21, 1957 |
| 2,844,513 | Wettstein et al. | July 22, 1958 |
| 2,865,935 | Schneider et al. | Dec. 23, 1958 |

OTHER REFERENCES

Hogg et al.: J.A.C.S. 77, 6401–2 (1955).
Steinberg et al.: Chemistry and Industry, Aug. 2, 1958, pages 975–6.
Bell et al.: J. Chem. Soc., vol., 1950, pages 1963–6.
Wendler et al.: J.A.C.S. vol. 74, pages 3962–3 (1952).